(12) United States Patent
Hille et al.

(10) Patent No.: US 6,718,786 B1
(45) Date of Patent: Apr. 13, 2004

(54) COIL HOUSING DESIGN FOR A BUS AIR CONDITIONING UNIT

(75) Inventors: Andreas Hille, Renningen (DE); Robert C. Reimann, LaFayette, NY (US); Belin Czechowicz, Dewitt, NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 10/429,454

(22) Filed: May 5, 2003

(51) Int. Cl.[7] .............................................. F25B 47/00
(52) U.S. Cl. ......................................... 62/279; 62/344
(58) Field of Search .......................... 62/279, 262, 244, 62/429, 508, 280, 344

(56) References Cited

U.S. PATENT DOCUMENTS 4,641,502 A * 2/1987 Aldrich et al. ................. 62/244
6,357,249 B1 * 3/2002 Robinson et al. ............. 62/285

* cited by examiner

Primary Examiner—Melvin Jones
(74) Attorney, Agent, or Firm—Wall Marjama & Bilinski LLP

(57) ABSTRACT

A compact rooftop air conditioning unit for a vehicle, said unit having an evaporator coil located in front of a condenser coil. At least one cylindrical blower is mounted adjacent the evaporator coil and is arranged to provide conditioned the blower and a condensate pump is secured to the shaft for pumping condensate generated by the evaporator coil back over the condenser coil. An electrically driven compressor is housed within the unit and is arranged so that no refrigerant lines pass outside of the unit. An inverter is also housed within the unit and provides a regulated input to the compressor and the blower drive motor. The heat exchanger coils are mounted in the form of two tube sheets take over the function of a housing, with the drip pan closing the bottom and the unit lid closing the top to form the completed unit.

2 Claims, 4 Drawing Sheets

COIL HOUSING DESIGN FOR A BUS AIR CONDITIONING UNIT

CROSS REFERENCE TO RELATED APPLICATIONS

This application is related to the following pending applications being concurrently filed herewith and assigned to the assignee of the present invention:

| Title | Our Docket No.: |
|---|---|
| Modular Rooftop Air Conditioner for a Bus | 210_546 |
| Modular Bus Air Conditioning System | 210_545 |
| Supply Air Blower Design in Bus Air Conditioning Units | 210_549 |
| Bus Rooftop Condenser Fan | 210_550 |
| Method and Apparatus for Refreshing Air in a Bustop Air Conditioner | 210_548 |
| Coil Housing Design for a Bus Air Conditioning Unit | 210_547 |
| Integrated Air Conditioning Module for a Bus | 210_558 |
| Fresh Air Intake Filter and Multi Function Grill | 210_554 |
| Integrated Air Conditioning Module for a Bus | 210_557 |
| Modular Air Conditioner for a Bus | 210_561 |
| Modular Air Conditioner for a Bus Rooftop | 210_562 |
| Evaporator Section for a Modular Bus Air Conditioner | 210_564 |
| Wide Evaporator Section for a Modular Bus Air Conditioner | 210_565 |
| Condensate Pump for Rooftop Air Conditioning Unit | 210_568 |
| Condensate Removal System Rooftop Air Conditioning | 210_551 |
| Modular Rooftop Unit Supply Air Ducting Arrangement | 210_577 |
| Configuration for Modular Bus Rooftop Air Conditioning System | 210_595 |
| Unibody Modular Bus Air Conditioner | 210_596 |

FIELD OF THE INVENTION

This invention relates in general to an air conditioning unit and more specifically to a rooftop air conditioning unit for a vehicle such as a bus.

BACKGROUND OF THE INVENTION

The most common approach for air conditioning the interior of a bus is to mount the air conditioning components on the roof of the vehicle. It has been the common practice in the industry to locate the compressor for the unit in the vehicles motor compartment so that it can be driven directly from the engine. The compressor, in turn, must be connected to the air conditioning unit by means of refrigerant supply and return lines. This requires running an extensive amount of piping through the bus between the engine compartment and air conditioner. The piping tends to sweat depending upon the atmospheric conditions inside and outside of the bus and therefore poses a constant danger to the bus structure and a nuisance to passengers seated beneath a sweating pipe.

In addition, in existing bus rooftop air conditioning units it is common to design the unit with an evaporator housing with integrated bottom drip pan, and an evaporator coil mounted into the housing. An evaporator lid is included to cover the housing. The same design principles apply to the condenser design where also a condenser housing, a condenser lid and the condenser coil is used. Due to this design, about 25% of the total cost of the unit is included into the housing and the housing lid.

SUMMARY OF THE INVENTION

It is therefore an object of the present invention to overcome the problems of the prior art described above, and reduce the overall cost of rooftop air conditioning units described herein.

It is another object of the present invention to provide an improved air conditioning unit that is mounted upon the roof of a bus or similar type of vehicle.

It is a further object of the present invention to provide an improved heat exchanger design for an air conditioning unit that is mounted upon the roof of a bus.

It is another object of the present invention to provide a heat exchanger design which obviates the need for multiple housings in a low profile air conditioning unit that is mounted upon the roof of a bus.

It is yet another object of the present invention to provide a novel heat exchanger design for a roof top air conditioning unit of a vehicle which reduces the number of parts, fasteners and assembly labor time.

These and other objects of the present invention are attained by a compact rooftop air conditioning unit for a bus or similar type vehicle that contains an electrical driven compressor and an inverter for regulating the electrical input to the electrical components contained within the unit. The evaporator coil of the unit is mounted in front of a condenser coil, and at least one cylindrical evaporator fan is mounted adjacent the evaporator coil upon a horizontally disposed shaft which, in turn, is rotated by an electrical motor. A drip pan is positioned beneath the evaporator coil and is arranged to pass the collected condensate into the sump of a pump housing through an inlet port.

The invention eliminates the need for the use of multiple housings in which the heat exchanger coils are mounted in that two tube sheets take over the function of the housing side wall with the evaporator drip pan closing the air handling box from the bottom and the unit lid closing the air handling box from the top.

BRIEF DESCRIPTION OF THE DRAWINGS

For a further understanding of these and objects of the invention, reference will be made to the following detailed description of the invention which is to be read in connection with the accompanying drawings, wherein.

DETAILED DESCRIPTION OF THE INVENTION

Figure 1:
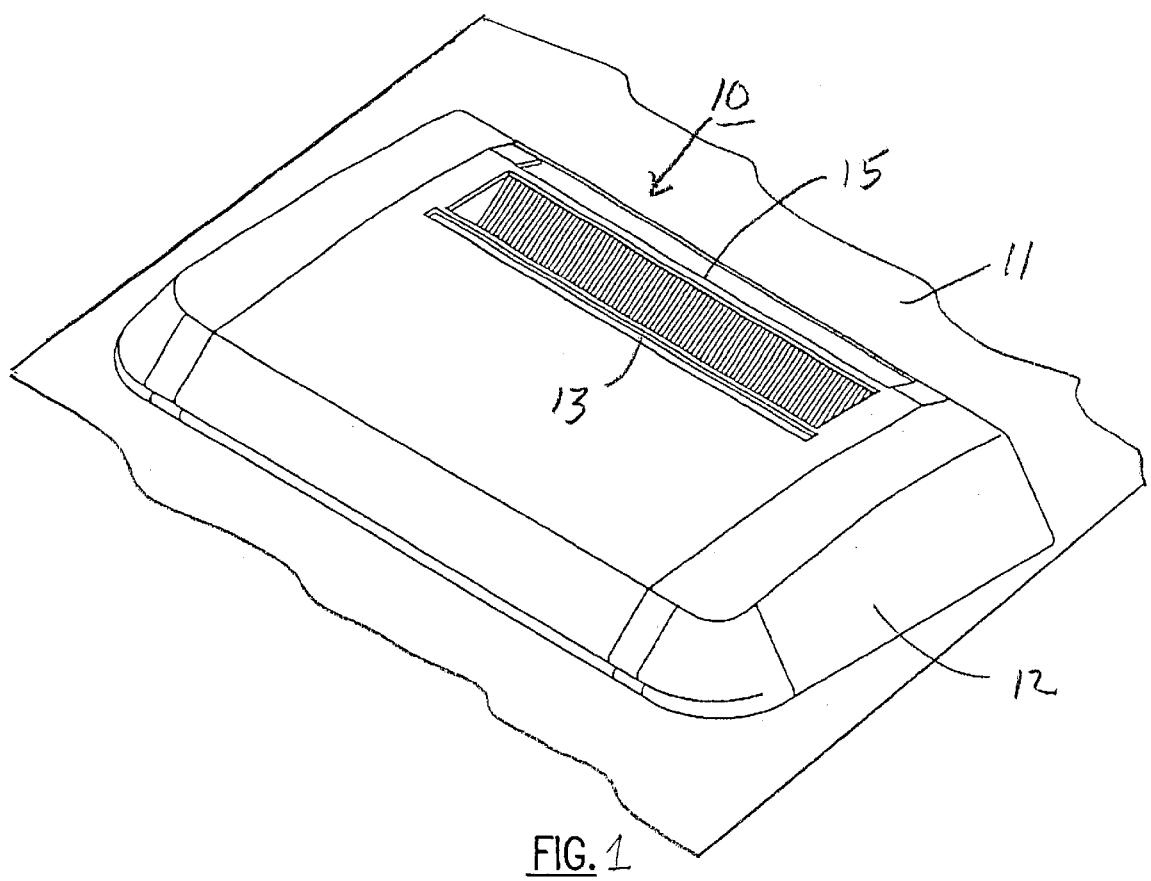
FIG. 1 is a perspective view of a compact air conditioning unit suitable for mounting up the roof of a vehicle and, in particular, the roof of a bus.

Referring to the drawings, FIG. 1 illustrates a low profile, compact, air conditioning unit, generally referenced 10, that is ideally well suited for mounting upon the roof 11 of a vehicle such as a bus. The working components of the unit are housed in a stream-lined protective cover 12 preferably fabricated of plastic. The cover contains an elongated opening 13 that extends laterally along the top of the cover. A portion of the unit's condenser coil 15 is located within the opening so that outside air can be drawn by the condenser fan (not shown) over the heat exchange surfaces of the condenser coil.

Figure 2:
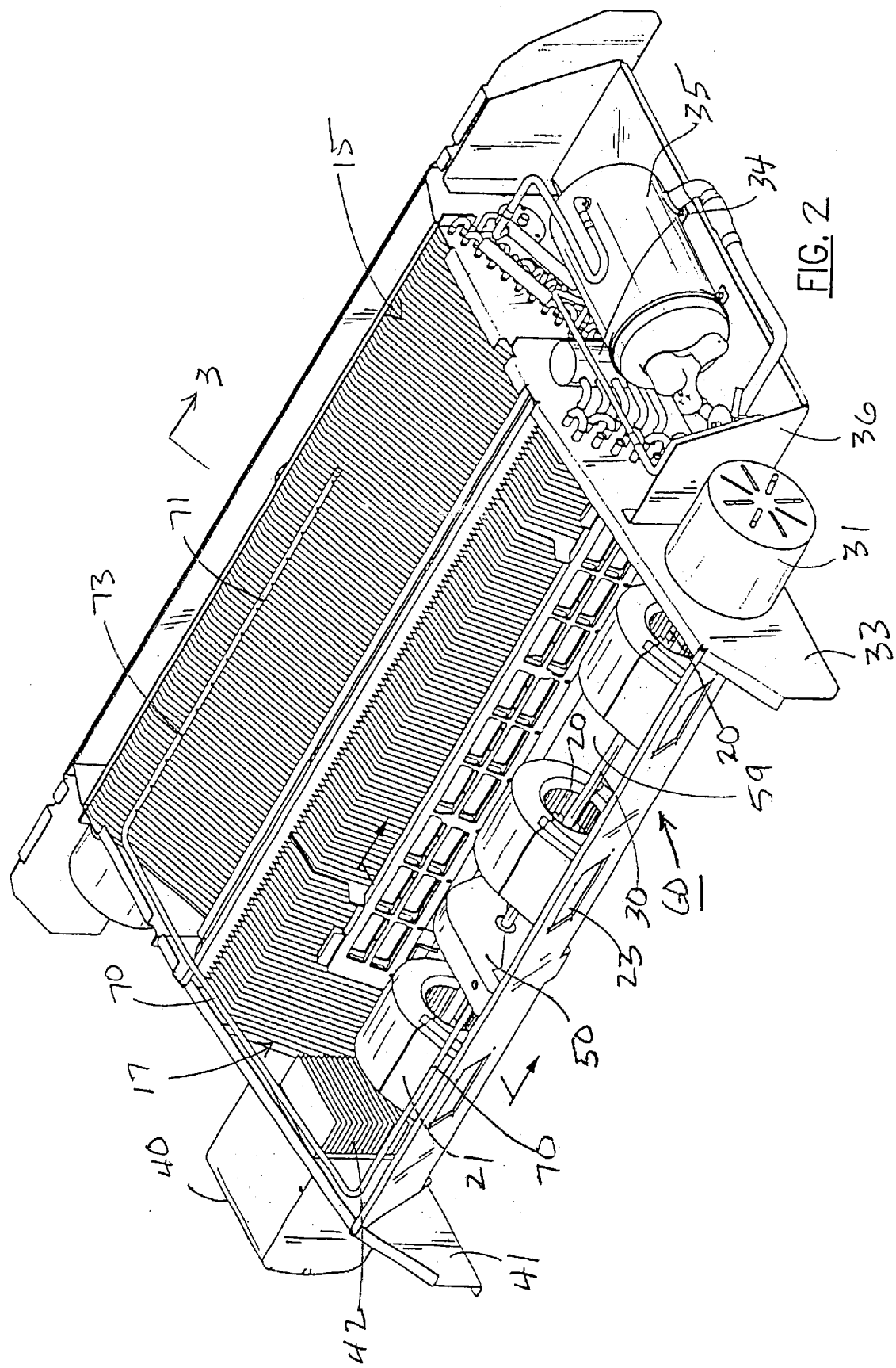
FIG. 2 is an enlarge perspective view of the air conditioning unit shown in FIG. 1 with the cover removed to better illustrate the internal components of the unit.

The unit is illustrated in FIG. 2 with the outer cover removed. To more clearly show the component parts of the unit, the evaporator coil 17 of the unit is located directly in front of the condenser coil 15. The heat exchanger fins of the two coils are contoured to provide a maximum amount of heat exchanger surface area within a minimum amount of available space. The coil fins are set at an angle to lower the overall height of the unit. As noted above, outside air is drawn over the surfaces of the condenser coil and is discharged through the back of the housing.

Figure 3:
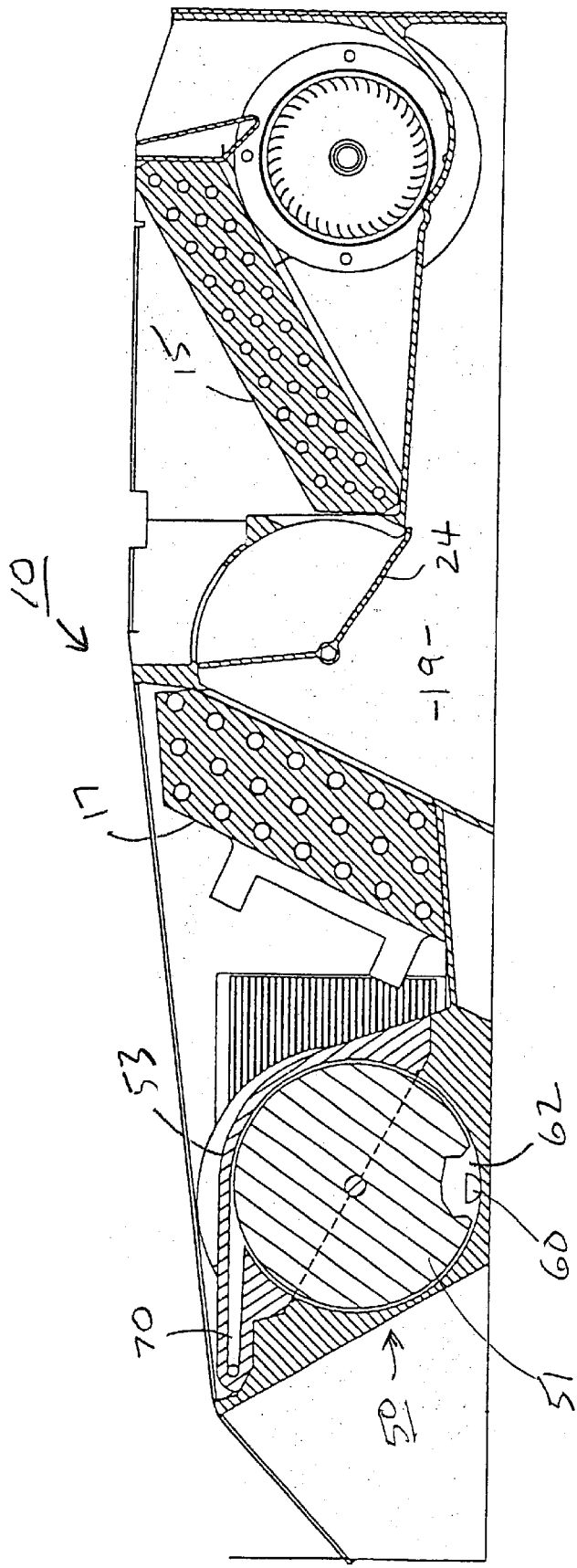
FIG. 3 is a side sectional view taken through the unit shown in FIG. 2.

As shown in FIG. 3 a return air duct 19 is provided in the unit between the two coils. A series of cylindrical blower wheels 20 are positioned in front of the evaporator coil and each blower is contained within a separate blower wheel housing 21. The blower wheels are arranged to draw return air from the passenger compartment into the duct 19 and then through the evaporator coil. The conditioned supply air is then directed back into the passenger compartment through supply air ports 23. An adjustable damper 24 is located in the return air duct 19 that can be positioned to regulate the addition of outside air to the return air stream being drawn from inside the bus.

Each blower wheel is secured to a common drive shaft 30 and the drive shaft is rotated by a single electric motor 31 that is mounted upon the outside of the side panel 33 of the air conditioning unit.

An electrically driven compressor 35 is mounted within a bracket 36 and the bracket secured to side wall 33. The compressor is connected to the two heat exchanger coils of the unit by suitable refrigerant lines and the refrigerant is throttled from the high pressure side of the system via an expansion valve 34. A compressor operates in a conventional manner to bring refrigerant from the lower pressure side of the air conditioning system to the high pressure side. The compressor 35 as well as motor 31 and condenser fan motor (not shown) are all powered by a regulated electrical input from an inverter 40 which is secured to the other side panel 41 of the unit. The inverter contains a series of cooling fins 42 that extend into the evaporator region for maintaining the inverter at a desired operating temperature. Although, not shown, power to the inverter is provided by a generator that is driven by the engine of the vehicle.

A condensate pump, generally referenced 50, is mounted in front of the evaporator coil 17 in coaxial alignment with the blower wheels 20. As illustrated in FIGS. 2 and 3, the pump includes a flat faced circular disc 51 that is secured to the drive shaft 30 which services the evaporator blowers. The disc is contained within a housing that includes a main body section 53. An inlet port 60 is provided in the main body section of the housing through which condensate from the evaporator coil is permitted to enter the lower sump region 62 of the pump cavity. A drip pan 59 is located beneath the evaporator coil. The floor of the pan slopes downwardly toward the inlet port of the pump so that any condensate that is collected is directed into the sump of the pump housing. A discharge tube 70 is connected into the upper chamber of the housing, and as illustrated in FIG. 2, the tube extends back around the evaporator coil and terminates in a planar end section 71 that is adjacent to the upper surface of the condenser coil 15. A series of discharge ports 73 are placed in the end section of the tube which are arranged to discharge condensate over the heat exchanger surfaces of the condenser coil. As a result, the condensate is evaporated and the water vapor is discharged from the unit through the opening in the upper part of the cover.

Figure 4:
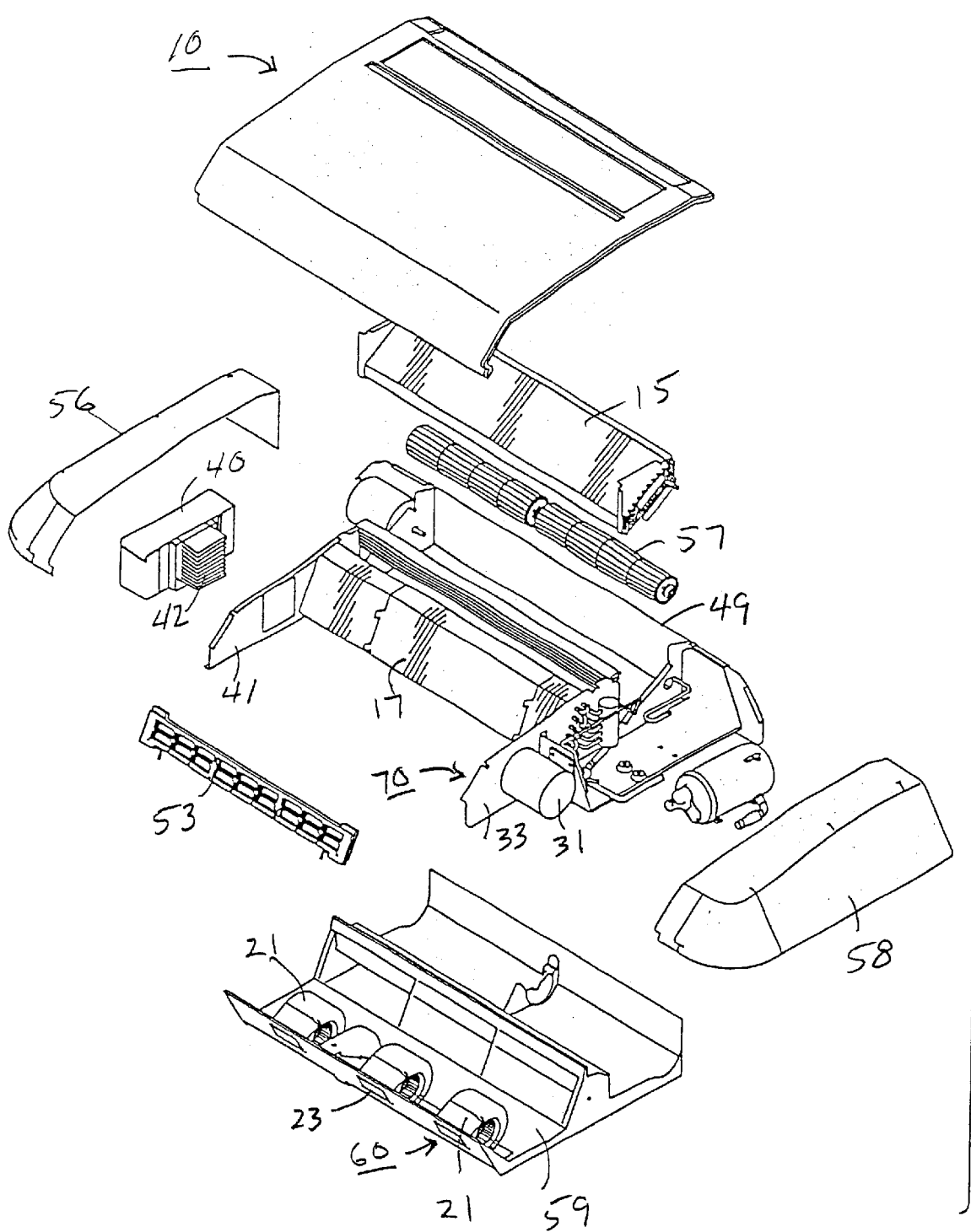
FIG. 4 is an exploded view of the unit shown in FIG. 2.

FIG. 4 is an exploded view of the unit illustrated in FIG. 2. In this view tube sheet 70 which includes side walls 33 and 41, and back plate 49 support the evaporator and condenser coils 17 and 15 and eliminate the conventional evaporator and condenser housings, thereby reducing the number of parts, fasteners and assembly time. The tube sheet 70 further supports transverse fan 57, heater 53, and end panels 56 and 58. In operation, coils 15 and 17 are integral with tube sheet 70. When the unit is assembled, evaporator drip pan assembly 60 closes the bottom of the unit and the unit lid 10 closes the unit or air handling box from the top.

As can also be seen from the above description, in this arrangement of components, there is no need to pass refrigerant lines through the passenger compartment of the bus. Accordingly, the chance of moisture generated by refrigerant lines within the compartment is eliminated.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A compact roof top air conditioning unit for a vehicle, said unit having an evaporator coil mounted in front of a condenser coil integral with and in the form of two tube sheets which function in place of a housing side wall, wherein said unit further includes:

at least one cylindrical blower mounted upon a horizontally disposed shaft for moving return air from a conditioned region inside said vehicle over the evaporate coil;

an electrical drive motor for turning said shaft;

a pump means secured to said shaft for pumping condensate generated by the evaporator coil over the surface of the condenser coil; and a drip pan mounted beneath the evaporator coil which closes said unit from the bottom, said drip pan having a trough for conducing condensate away from the evaporator coil; and a unit lid which closes said unit from the top.

2. A compact rooftop air conditioning unit for a vehicle, said unit having an evaporator coil mounted in front of a condenser coil in the form of two tubes sheets which function in place of a housing side wall, wherein said unit further includes:

an electrical compressor for moving refrigerant between said coils;

at least one cylindrical blower mounted upon a horizontally disposed shaft for moving return air from inside the vehicle through the evaporator coil;

an electrical drive means for turning said shaft;

an inverter for controlling the electrical input to said compressor and said drive means;

a pump means secured to said shaft for pumping condensate generated by the evaporator coil over the surface of the condenser coil;

a drip pan mounted beneath the evaporator coil which closes said unit from the bottom; and a unit lid which closes said unit from the top.

* * * * *